(12) United States Patent
Lafleur et al.

(10) Patent No.: US 6,763,310 B2
(45) Date of Patent: Jul. 13, 2004

(54) MODAL ANALYSIS METHOD AND APPARATUS THEREFOR

(75) Inventors: François Lafleur, Laprairie (CA); Frédéric Laville, Montreal (CA); Marc Thomas, Montreal (CA)

(73) Assignee: Centre de Recherche Industrielle du Québec, Sainte-Foy (CA)

( * ) Notice: Subject to any disclaimer, the term of this patent is extended or adjusted under 35 U.S.C. 154(b) by 0 days.

(21) Appl. No.: 10/142,871

(22) Filed: May 13, 2002

(65) Prior Publication Data

US 2002/0183942 A1 Dec. 5, 2002

Related U.S. Application Data

(60) Provisional application No. 60/290,622, filed on May 14, 2001.

(51) Int. Cl.[7] .............................................. G06F 19/00
(52) U.S. Cl. ........................................ 702/33; 702/56
(58) Field of Search ....................... 73/579, 584, 594, 73/570, 571; 702/54, 56, 66, 75, 109, 33

(56) References Cited

U.S. PATENT DOCUMENTS

| | | | |
|---|---|---|---|
| 4,061,017 A | * 12/1977 | Sloane et al. ................... | 73/579 |
| 5,226,326 A | *  7/1993 | Polen et al. .................... | 73/571 |
| 5,471,877 A | * 12/1995 | Brown .......................... | 73/571 |
| 5,841,030 A | * 11/1998 | Honsberg et al. .............. | 73/579 |
| 5,929,340 A | *  7/1999 | Cochran et al. ............... | 73/766 |
| 6,005,404 A | * 12/1999 | Cochran et al. .............. | 324/760 |
| 6,006,163 A | * 12/1999 | Lichtenwalner et al. ...... | 702/36 |
| 6,363,789 B1 | *  4/2002 | Rassaian et al. .............. | 73/663 |

OTHER PUBLICATIONS

Yang, Q ; Lim, G ; Lin, R ;Yap, F; Peng, H; Wang, Z; "Experimental Modal Analysis of PBGA Printed Circuit Board Assemblies";Proceedings 1997 Electronic Packaging Technology Conference; Oct. 1997; pp 290–296.*

Garry, W; "Developing an ESS Automation Tool";Proceedings Annual Reliability And Maintainability Symposium; 1989; pp 495–501.*

D.J. Ewins, Modal . . . and Practice, 1984, pp. 57–59, 157, 159, 224–226, 255–256, RSP Ltd, Gr. Britain.

* cited by examiner

*Primary Examiner*—John Barlow
*Assistant Examiner*—Douglas N Washburn
(74) *Attorney, Agent, or Firm*—Jean-Claude Boudreau

(57) ABSTRACT

A modal analysis method and apparatus for acoustically determining vibration characteristics of a structure uses a MISO model. An acoustic excitation signal toward spatially distributed locations associated with the structure is generated while the latter is held vibrated, one location being chosen as reference. Complementary sets of input acoustic pressure-related signals are produced, one being a reference signal. Fourier analysis is performed on the input signals to provide correlated input acoustic pressure-related data in frequency domain including reference data. Induced output vibration is sensed at a reference point on the structure corresponding to the reference to produce complementary sets of output vibration signals, which are converted through Fourier analysis into sets of output vibration data in frequency domain. Structural transfer functions characterizing each set of input acoustic pressure-related data are obtained from which vibratory characteristics of the structure are derived.

3 Claims, 6 Drawing Sheets

MODAL ANALYSIS METHOD AND APPARATUS THEREFOR

This application claims the benefit of U.S. Provisional Application No. 60/290,622 filed May 14, 2001.

BACKGROUND OF THE INVENTION

1. Field of the Invention

The present invention relates to modal analysis of a structure for determining dynamic vibratory characteristics thereof, and more particularly to modal analysis method and apparatus using acoustical excitation to impart vibration to the structure under test.

2. Brief Description of the Prior Art

Modal analysis techniques have been recently applied to many vibratory testing applications, and particularly in Environmental Stress Screening (ESS) tests such as those performed in printed circuit boards (PCB's) manufacturing as part of quality control procedures.

According to conventional ESS procedures for testing PCB's, determination of the vibration spectrum required for testing a particular PCB is usually an empirical matter. Induced fatigue and precipitation of latent defects are generally not estimated considering the actual stress within the circuit, but are rather empirically estimated from the vibration level as measured. Types of defects that are precipitated with a stimulation using random vibrations are mainly related to poor solders, component or substrate defects, connector problems, poor securing of cables and components, and structural problems. Methods of determining the spectrum of a vibrating excitation typically range from the study of vibrating behavior with comparison of the global response to predetermined optimum vibration levels, to the use of spectrums previously employed with success for other similar products. An intermediary method consists of introducing typical defects in a product and then increasing the vibration level until these defects repetitively precipitate, which method requires to apply long-continued vibrating stimulation, typically of about 10 minutes or more. In order to improve efficiency over these known methods, a structural model characterizing the vibration response of a product can be built prior to determine the spectrum of vibrating stimulation likely to produce the target frequency response profile. For this purpose, modal analysis techniques are used, such as those described in the applicants' papers "Modal analysis of electronic circuit using acoustical sources", 4th Annual IEEE Accelerated Stress Testing, 1998, and "Experimental modal analysis using acoustical sources (translated title)", 17th Canadian Congress on Applied Mechanics, 1999, which above reference present comparison results between some modal analysis techniques for the characterization of Printed Circuit Boards (PCB's), namely hammer testing, shaker testing and acoustical excitation. Modal analysis essentially consists in establishing a theoretical model in terms of vibration parameters including resonance frequencies and damping factor associated with main modes of vibration. Then, values of these vibration parameters are determined experimentally using either a mechanical or acoustical source of vibration, such as disclosed in the inventor's prior International PCT application no. WO 01/01103 to the applicants as published on Jan. 4, 2001, along with conventional vibration measuring instrumentation. From the obtained vibration parameters values, vibrating stimulation levels required to comply with ESS testing requirements can be predicted as well as optimal vibration spectrums. Acoustic excitation is a very attractive, non-contact approach for excitation of flexible structures. Unfortunately, an acoustical source does not produce a localized force on the structure under test, and therefore a plurality of vibration transducers (accelerometers) directly mounted on the article under test have been required heretofore, such as taught in the above-cited publications from the applicants. A complex set-up of transducers and cables must be realized to perform modal analysis of a specific structure to be tested, implying time-consuming calibration procedures.

BRIEF SUMMARY OF THE INVENTION

It is therefore an object of the present invention to provide an acoustic-based modal analysis method and apparatus for determining dynamic vibration characteristics of a structure, which minimizes the number of output vibration transducers required.

According to a further broad aspect of the invention, there is provided a modal analysis method for acoustically determining dynamic vibration characteristics of a structure, the method comprising steps of: a) generating an acoustic excitation signal toward n spatially distributed locations associated with the structure while the latter is held to allow vibration thereof, one of said locations being a reference location; b) sensing the acoustic excitation signal at the locations to produce a corresponding set of n correlated input acoustic pressure-related electrical signals, one of the electrical signals being a reference signal associated with the reference location; c) converting the set of n correlated input acoustic pressure-related electrical signals into a set of correlated input acoustic pressure-related data in the frequency domain including reference data associated with the reference signal; d) sensing induced output vibration in response to the acoustic excitation at a reference point on the excited structure corresponding to the reference location to produce an output vibration response electrical signal; e) converting the output vibration response electrical signal into a set of output vibration response data in the frequency domain; f) providing n input transfer functions characterizing the correlation between the input acoustic pressure-related data and the reference data; g) performing said steps a) to f) for m−1 complementary acoustic excitation signals with m≧n, to produce m−1 complementary sets of input acoustic pressure-related data and to produce m−1 complementary sets of output response vibration data; h) obtaining n structural transfer functions characterizing each set of input acoustic pressure-related data from relations between the m sets of n input transfer functions and the m sets of output vibration response data; and i) deriving from the structural transfer functions the dynamic vibratory characteristics of the structure.

According to a further broad aspect of the invention, there is provided a modal analysis method for acoustically determining dynamic vibration characteristics of a structure, the method comprising steps of: a) generating an acoustic excitation signal toward n spatially distributed locations associated with the structure while the latter is held to allow vibration thereof, one of said locations being a reference location; b) sensing the acoustic excitation signal at the locations to produce a corresponding set of n correlated input acoustic pressure-related electrical signals, one of the electrical signals being a reference signal associated with the reference location; c) converting the set of n correlated input acoustic pressure-related electrical signals into a set of correlated input acoustic pressure-related data in the frequency domain including reference data associated with the reference signal; d) sensing induced output vibration in response to the acoustic excitation at a reference point on the excited structure corresponding to the reference location to produce an output vibration response electrical signal; e) converting the output vibration response electrical signal into a set of output vibration response data in the frequency domain; f) providing n input transfer functions characterizing the correlation between the input acoustic pressure-related data and the reference data; g) performing said steps a) to f) for m-1 complementary acoustic excitation signals with m≧n, to produce m-1 complementary sets of input acoustic pressure-related data and to produce m-1 complementary sets of output response vibration data; g) obtaining n structural transfer functions characterizing each set of input acoustic pressure-related data from relations between the m sets of n input transfer functions and the m sets of output vibration response data; and h) deriving from the structural transfer functions the dynamic vibratory characteristics of the structure.

According to a still further broad aspect of the invention, there is provided modal analysis apparatus for determining dynamic vibration characteristics of a structure. The apparatus comprises acoustical source means capable of generating m complementary sets of correlated acoustic excitation signals toward n spatially distributed locations associated with the structure, one of said locations being a reference location, and a structure holder provided with attachment means for holding the structure while allowing thereof to vibrate under the acoustic excitation signals. The apparatus further comprises acoustic sensor means responsive to the acoustic excitation signal at the locations to produce m complementary sets of n correlated input acoustic pressure-related electrical signals, one of the electrical signals being a reference signal associated with said reference location, and Fourier transform means for converting the sets of correlated input acoustic pressure-related electrical signals into sets of correlated input acoustic pressure-related data in the frequency domain including reference data associated with the reference signal. The apparatus further comprises vibration sensing means responsive to induced output vibration in response to the acoustic excitation at a reference point on the excited structure corresponding to the reference location to produce m complementary output vibration electrical signals and Fourier transform means for converting the output vibration electrical signals into m sets of output vibration data in the frequency domain. The apparatus further comprises data processor means responsive to the sets of correlated input acoustic pressure-related data and to the sets of output vibration data for providing n input transfer functions characterizing the correlation between each set of acoustic pressure-related data and the reference data, for obtaining n structural transfer functions characterizing each set of input acoustic pressure-related electrical data from relations between the m sets of n input transfer functions and the m sets of output vibration response data, and for deriving from the structural transfer functions the dynamic vibratory characteristics of the structure.

BRIEF DESCRIPTION OF THE DRAWINGS

Preferred embodiments of a modal analysis method and apparatus according to the invention will now be described in view of the accompanying drawings in which.

DETAILED DESCRIPTION OF THE PREFERRED EMBODIMENTS

In the present specification, the apparatus and method according the present invention will be described in view of a particular application dealing with PCB's as tested structures. However, it is to be understood that the application scope of the present invention is by no means limited to PCB's or like flexible structures, but to any other structure for which dynamic vibration characteristics has to be determined.

Figure 1:
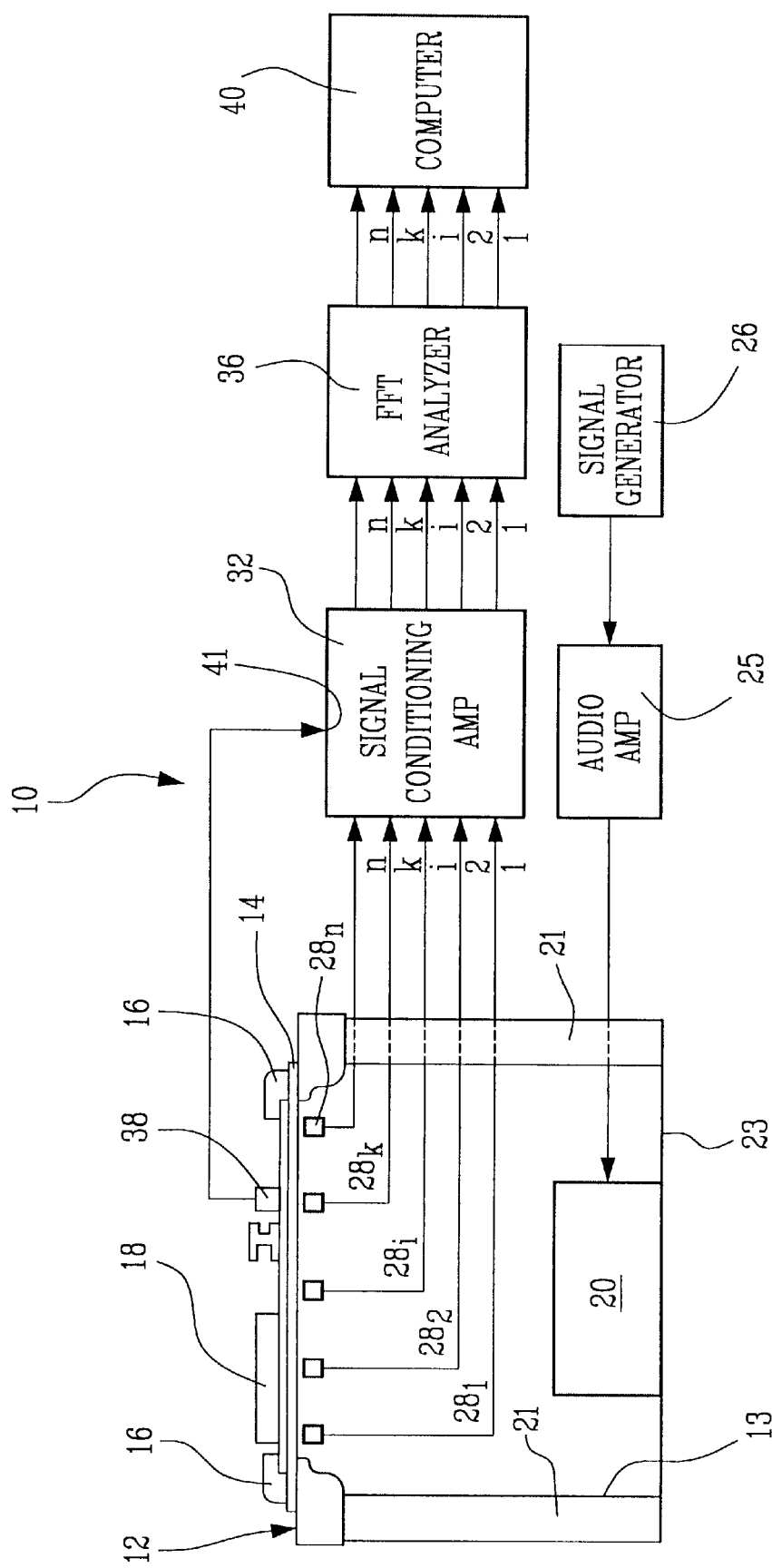
FIG. 1 is a schematic view of a preferred embodiment of a modal analysis apparatus according to the present invention.
Figure 2:
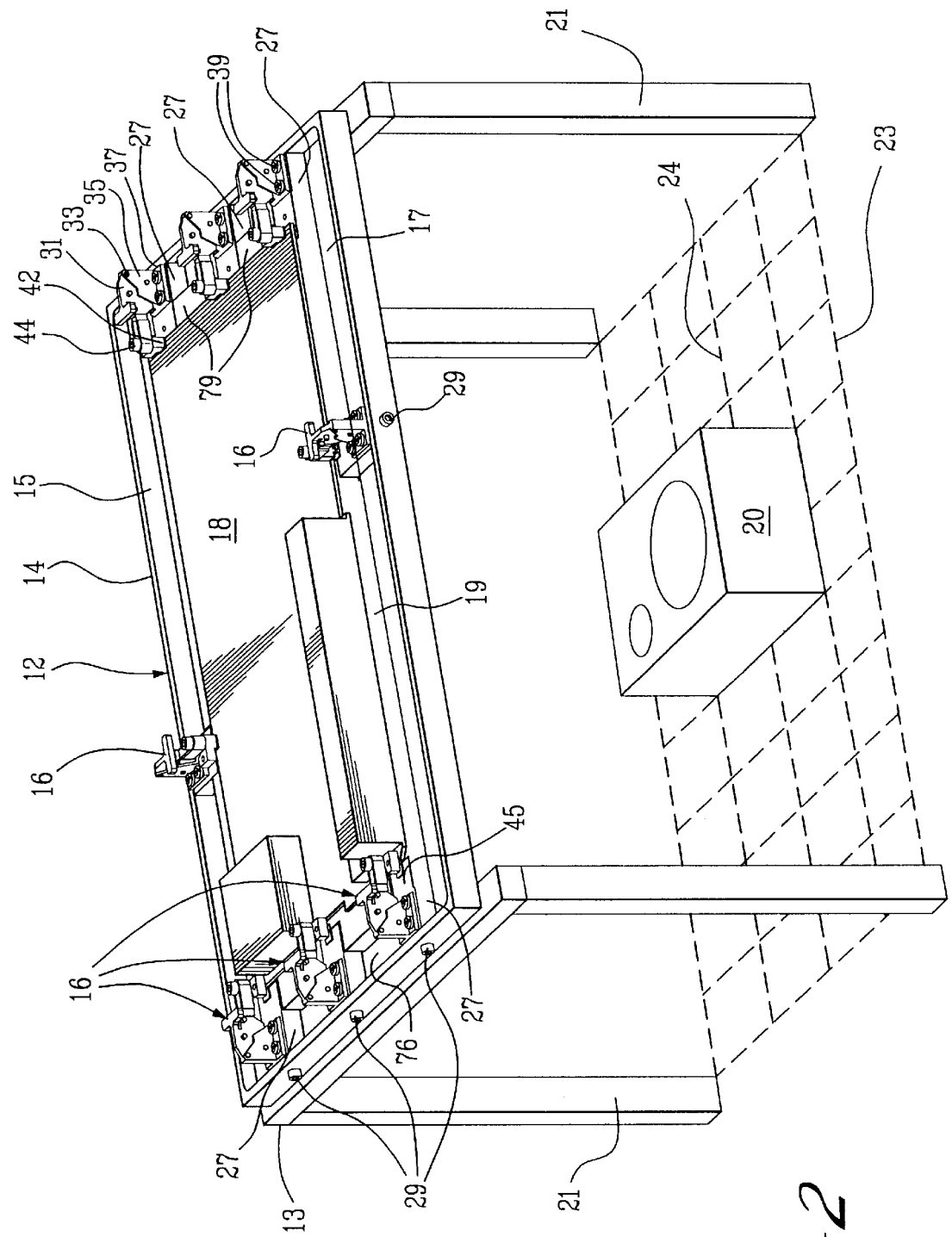
FIG. 2 is a perspective view of a PCB holder and loudspeaker provided on a preferred embodiment of the apparatus according to the invention.

Referring to FIG. 1, the modal analysis apparatus according to the invention as generally designated at 10 comprises a structure holder 12 having a main frame 13 provided with attachment means in the form of a fixture 14 having adjustable clamps 16 for securing a PCB 18 at a peripheral portion thereof to allow vibration under acoustic excitation, as will be explained later in detail. The fixture 14 is preferably of a similar design as the fixture described in the above-cited published international PCT application no. WO 01/01103 to the applicants. As shown in FIG. 2, the fixture 14, which is designed to receive a single PCB 18 in the example shown, comprises a generally rectangular outer frame 15 provided with a recessed planar portion 17 defining a central opening 19 to be aligned with a locating reference pattern 24 printed on a mat 23 or directly on the floor, by positioning the legs 21 of main frame 13 accordingly. The clamps 16 are mounted on fixture planar portion 17, which clamps having mounting blocks 27 that can be locked in a predetermined position along the corresponding sides of the frame 15 by set screws 29 extending through corresponding bores provided on the sides of frame 15, and through corresponding threaded bores provided on blocks 27. Alternatively, the sides of frame 15 may be provided with elongated slots (not shown) to allow position adjustment for the blocks 27. Each clamp 16 includes a spring-biased clamping member 31 cooperating through pivot 33 with a base member 35 having a pair of lateral flanges 37 being rigidly secured to the corresponding block 27 with screws 39. To the forward end of each clamping member 16 is secured a mounting spacer 42 fixed in a position parallel to a corresponding PCB edge with a set screw 44 vertically extending through the forward end of clamping member 31. Each mounting block 27 is provided with a rib (not shown) having an end that is vertically aligned with the mounting spacer 42 when the clamp is in a lock position, defining a tight space for receiving and maintaining the PCB edge adjacent portion. Facing ends of mounting spacers 42 and corresponding ribs are aligned with rubber pads 45 to ensure that the PCB edge surface is not damaged by the clamps 16 when the latter are brought in a lock position. The fixture 14 is designed to allow the mounting of a sufficient number of clamps 16 located on the periphery of the PCB to allow the latter to vibrate according to some vibration modes characterizing the structure, as will be explained later in more detail.

Turning back to FIG. 1, as part of an acoustical source and disposed under fixture 14 is an acoustical transducer or loudspeaker 20 to be located at a stable position with respect to the locating reference pattern 24, which allows positioning of the loudspeaker 20 at selected specific locations with reference to the central opening 19 of fixture 14, as will be explained later in more detail. The acoustical source further includes driver means operatively coupled to loudspeaker 20, in the form of a audio amplifier 25 responsive to an input signal, such as a white noise, generated by a signal generator 26. The apparatus further comprises a set of acoustical sensors in the form of a plurality of microphones $28_i$, with i=1, n, which are disposed at spatially distributed locations associated with the structure, generally according to a two-dimensional configuration. The value for n and the appropriate configuration for the microphones are dictated by the particular modal analysis to be performed. A selected one of microphones $28_i$ identified as $28_k$ is considered as a reference microphone disposed at a reference location, as will be explained later in more detail. Alternatively, a smaller number of microphones can be used by performing successive tests with the same microphones relocated at different positions. A vibration sensor in the form of an accelerometer 38 is disposed at a reference point on the structure or PCB 18, which reference point is spatially associated with the location of reference microphone $28_k$ being vertically aligned with accelerometer 38. The microphones $28_1$ to $28_n$ are coupled to corresponding n inputs provided on a conventional conditioning amplifier 32, which also receives at input 41 the output vibration signals coming from accelerometer 38. It is to be understood that separate conditioning instrumentation for the microphone signals and accelerometer signal can also be provided, as well known in the art. The conditioned outputs of signal conditioning amplifier 32 are fed to corresponding n inputs of a Fourier transform converter which is preferably a Fast Fourier Transform analyzer generating converted data in the frequency domain toward a data processor device such as computer 40 for further processing.

The principles on which is based the present invention will now be explained in detail. The non-contact modal analysis technique according to the invention is based on a particular Multiple Inputs Single Output model (MISO) using correlated acoustical excitation signals. The mode shapes and modal parameters of the structure are given by the identification of the Frequency Response Functions (FRF) obtained by acoustic pressures measurements of the excitation in the near field of the structure at a predetermined number of locations in accordance with the considered number of degrees of freedom, and by a single acceleration measurement of the structure response. Then, dynamic vibration characteristics of a structure under test, including natural frequencies, mode shapes and damping factors, can be determined using conventional derivation techniques.

Figure 3:
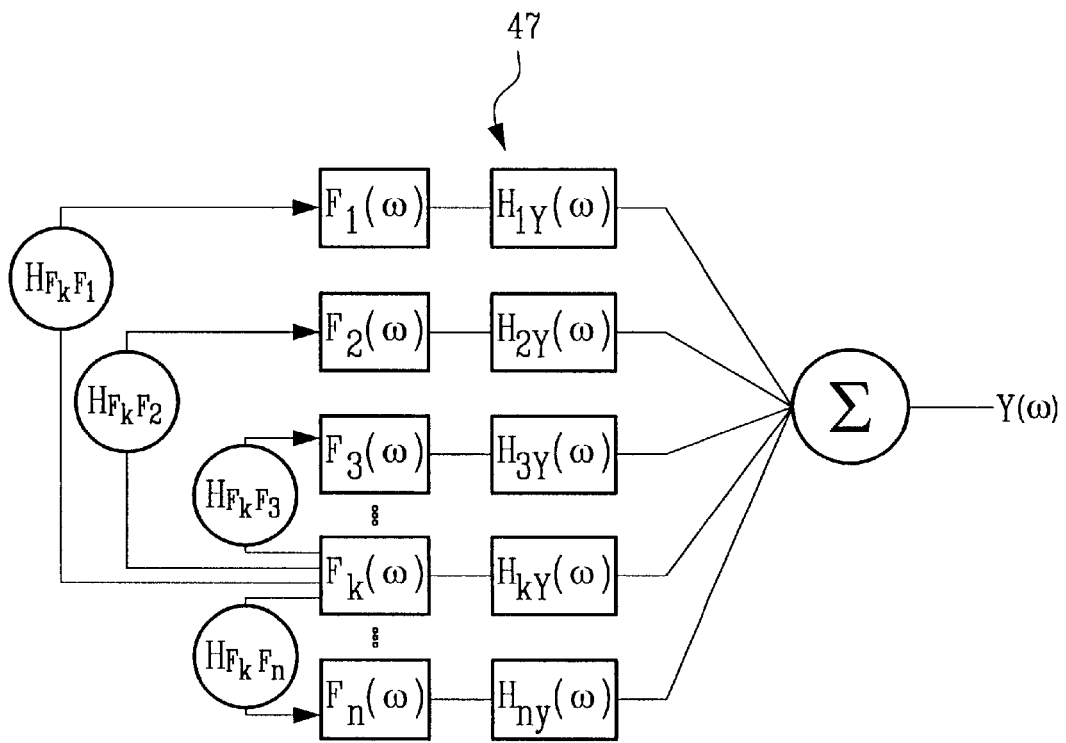
FIG. 3 is a block diagram of the Multiple-Inputs/Single Output model on which is based the principle set forth by the invention.

Referring to FIG. 3, a MISO system generally designated at 47 is defined by the application of several input forces $F_i(\omega)$ with i=1,2, . . . , k, . . . , n, which forces $F_i(\omega)$ are in the form of acoustic excitation signals as sensed by microphones $28_i$ at n spatially distributed locations associated with the structure, which microphones generate correlated input acoustic pressure-related electrical signals, and by the measurement of a single vibration response $Y(\alpha)$, as sensed by accelerometer 38 at a reference point on the excited structure. When a set of perfectly coherent external acoustic forces $F_i(\omega)$ is applied to the structure we can define the input transfer function between a force i and a force j as being $H_{FiFj}(\omega)$. This relation is expressed as follows by choosing a force $F_k(\omega)$ as a reference force associated with a reference location on the structure:

$$S_{FkFi} = H_{FkFi} \times S_{FkFk} \quad (1)$$

wherein $S_{FkFi}$ is the cross-spectrum between the reference force $F_k(\omega)$ and a force I, and $S_{FkFk}$ is the auto-spectrum of the reference force $F_k(\omega)$. The n input transfer functions $H_{FkFi}(\omega)$ characterize the correlation between the input acoustic pressure-related signal and the reference signal. These input transfer functions $H_{FkFi}(\omega)$ depend on the characteristics of the acoustic excitation and vary for each acoustic load case α according to the amplitude and phase relations between the forces. The dynamic mechanical system is characterized by a series of structural transfer function $H_{iY}(\omega)$ which are specific to the structure and depend on the modal parameters. The cross-spectrum between reference force $F_k(\omega)$ and response $Y(\omega)$ is expressed as follows:

$$S_{FkY} = \sum_{i=1}^{n} H_{iY} S_{FkFi} \quad (2)$$

We express the total response $Y(\omega)$ according to $F_k(\omega)$ in the following way:

$$Y = \sum_{i=1}^{n} H_{iY} H_{FiFk} F_k \quad (3)$$

The measurements of each input force $F_i(\omega)$ with i=1,2, . . . , k, . . . , n and of the vibration response $Y(\omega)$, expressed as frequency domain data through Fourier analysis, lead to only one equation with n unknowns which are the structural transfer functions $H_{iY}(\omega)$ of th structure, in terms of the n input transfer functions $H_{FkFi}(\omega)$ characterizing the correlation between the input acoustic pressure-related data and the reference data. It is thus necessary to increase the number of equations available to m≧n to be able to derive all $H_{iY}(\omega)$. By exciting the structure with complementary load cases with α=a . . . m and m≧n and by measuring each set of forces $F_i(\omega)$ and response $Y(\alpha)$, it is possible to express the system of relations in matrix form as follows:

$$\begin{bmatrix} H_{FkF1}(a) & H_{FkF2}(a) & H_{FkF3}(a) & \cdots & H_{FkFn}(a) \\ H_{FkF1}(b) & H_{FkF2}(b) & H_{FkF3}(b) & \cdots & H_{FkFn}(b) \\ H_{FkF1}(\alpha) & H_{FkF2}(\alpha) & H_{FkF3}(\alpha) & \cdots & H_{FkFn}(\alpha) \\ \vdots & \vdots & \vdots & \vdots & \vdots \\ H_{FkF1}(m) & H_{FkF2}(m) & H_{FkF3}(m) & \cdots & H_{FkFn}(m) \end{bmatrix} \begin{pmatrix} H_{1Y} \\ H_{2Y} \\ H_{3Y} \\ \vdots \\ H_{nY} \end{pmatrix} = \begin{Bmatrix} Y(a)/F_k(a) \\ Y(b)/F_k(b) \\ Y(\alpha)/F_k(\alpha) \\ \vdots \\ Y(m)/F_k(m) \end{Bmatrix} \quad (4)$$

wherein $H_{FkFi}(\alpha)$ are the input transfer functions between $F_k(\alpha)$ and $F_i(\alpha)$ for the load case α with α=a, . . . m.

In other words, once a first set of input acoustic pressure-related data $F_k(\alpha)$ for a first load case α=a is provided with its corresponding set of output response vibration data, the same type of data is obtained in a same manner as explained above for m−1 complementary acoustic excitation signals corresponding to m−1 further load cases with m≧n, to produce m−1 complementary sets of input acoustic pressure-related data and m−1 complementary sets of output response vibration data. In practice, a particular load case will be associated to a specific position of the loudspeaker 20 with respect to the reference pattern shown in FIG. 2. It is to be understood that any other means to provide a plurality of load cases, such as using a plurality of spatially distributed loudspeakers, are contemplated in practicing the present invention. Then, the n structural transfer functions $H_{iY}(\omega)$ characterizing each set of input acoustic pressure-related data can be obtained from a system of relations between the m sets of n input transfer functions and the m sets of output vibration response data. The system of relations can be easily solved by any appropriate technique such as inversing or pseudo-inversing techniques if $m \geq n$ to obtain:

$$\{H_{iY}\}_{(n \times 1)} = [H_{F_k F_i}(\alpha)]_{n \times m}^{-1} \{FRF(Y(\alpha)/F_k(\alpha))\}_{(m \times 1)} \quad (5)$$

where FRF is the vector (m×1) containing the FRF between the force $F_k(\alpha)$ with $\alpha = a, \ldots m$, and the acoustic response of the system $Y(\alpha)$. More specifically, the above system can be solved to identify the n structural transfer function $H_{iY}$:

$$\text{where } m = n \quad H_{(n \times 1)} = Z_{(n \times n)}^{-1} FRF_{(n \times 1)} \quad (6)$$

$$\text{where } m > n \quad H_{(n \times 1)} = P_{(n \times n)}^{-1} Z_{(n \times m)}^T FRF_{(m \times 1)} \quad (7)$$

wherein:

$$P_{(n \times n)} = Z_{(n \times m)}^T Z_{(m \times n)} \quad (8)$$

Once the $H_{iY}$ are obtained for each frequency, the n first mode shapes of the system with associated natural frequencies and damping factors can be derived using any usual techniques, such a peak amplitude method, as described by D. J. Ewins, <<Modal Testing: Theory and practice >>, Research Studies Press, 1984. There exist a number of modal analysis methods which, although different in their detail, all share the same basic assumption: namely, that in the vicinity of a resonance the total response is dominated by the contribution of the mode whose natural frequency is closest. The methods vary as to whether they assume that all the response is attributed to that single mode or whether the other modes' contributions are represented by a simple approximation. The simplest of these methods is one which has been used for a long time and which is sometimes referred to as the peak-amplitude or peak-picking method. This is a method which works adequately for structures whose FRF exhibit well-separated modes which are not so lightly-damped that accurate measurements at resonance are difficult to obtain but which, on the other hand, are not so heavily damped that the response at a resonance is strongly influenced by more than one mode. Although this appears to limit the applicability of the method, it should be noted that in the more difficult cases, such an approach can be useful in obtaining initial estimates to the parameters required, thereby speeding up the more general curve-fitting procedures described later. The method is applied as follows:

(i) first, individual resonance peaks are detected on the FRF plot as shown in FIG. 7a, corresponding to mathematical expression (2) above, and the frequency of maximum response taken as the natural frequency of that mode $\omega_r$;

(ii) second, the maximum value of the FRF is noted $|\hat{\alpha}|$ and the frequency bandwidth $\Delta \omega$ of the function for a response level of $|\hat{\alpha}|/\sqrt{2}$ is determined. The two points thus identified as $\omega_b$ and $\omega_a$ are the half-power points;

(iii) The hysteretic damping loss factor of the mode in question can now be estimated from the following formulae:

$$n_r = (\omega_a^2 - \omega_b^2)/\omega h d \ r^2 \approx \Delta \omega / \omega_r$$

which damping loss factor $n_r$ is related to the damping factor by a factor 2 as shown in equation (13) below;

(iv) Last, we may consider $|\hat{\alpha}|$ as an estimate for the modal constant of the mode being analyzed, corresponding to the mode shape as expressed by equation (10) above, by assuming that the total response in this resonant region is attributed to a single term in the general FRF series.

Figure 4:
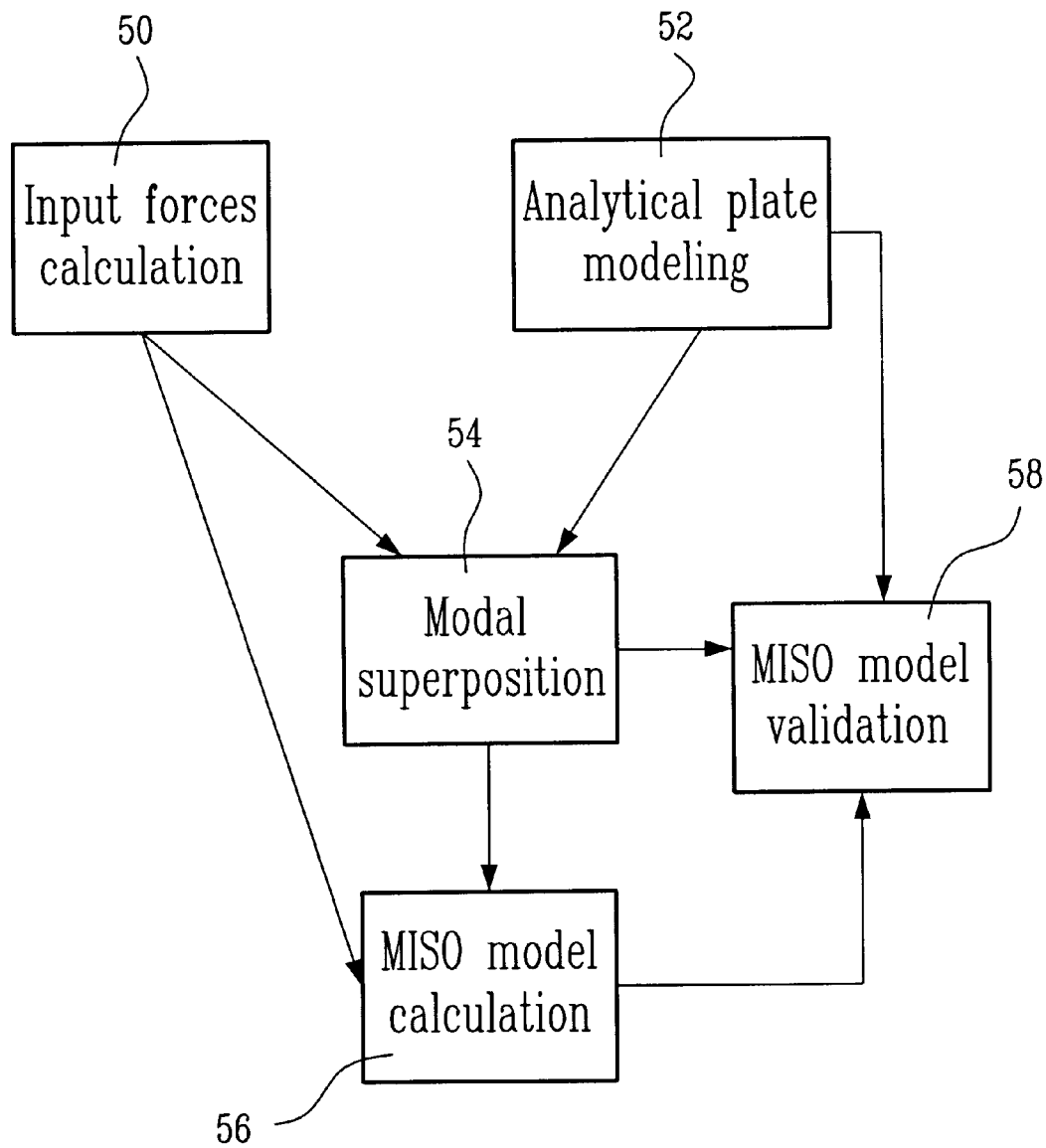
FIG. 4 is a flow chart representing the simulation process performed to verify performance of the method according to the invention.
Figure 6:
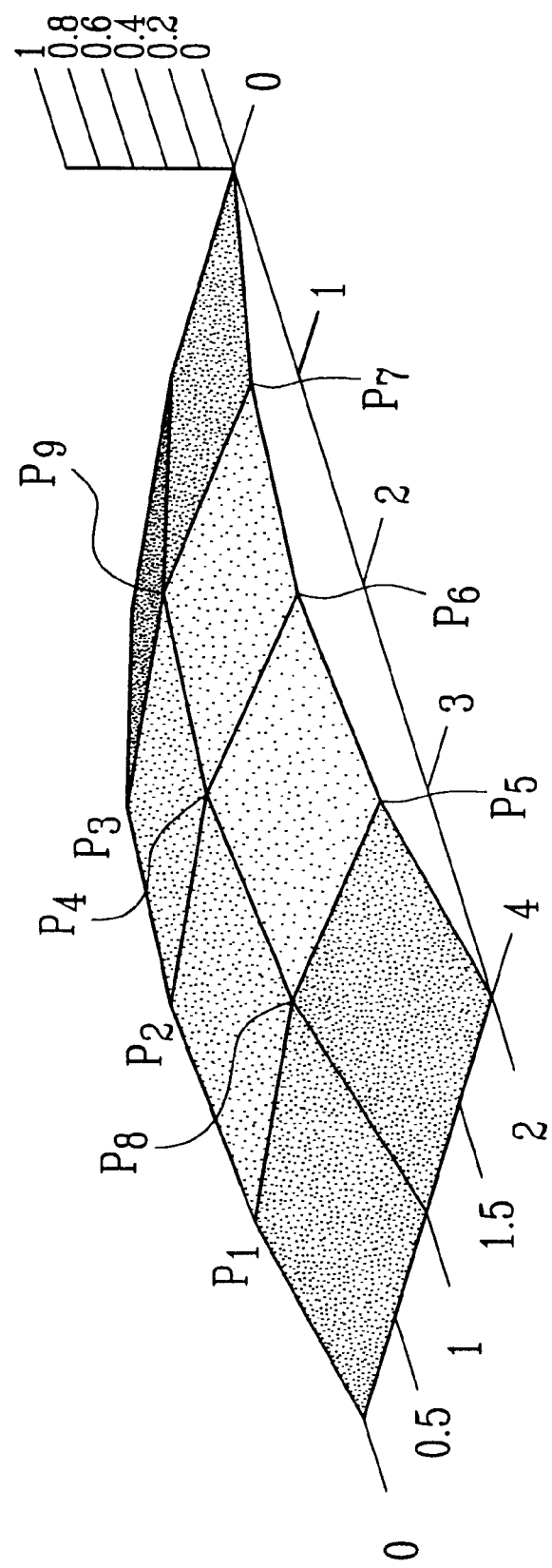
FIG. 6 is a graph showing an example of amplitude values for a first mode that has been identified by the method and apparatus of the present invention.

The method according to the invention has been proven through numerical simulation performed on a plate with simply supported boundary conditions using a number of load cases m=n=7, i.e. considering seven (7) acoustic excitation locations $p_1$ to $p_7$ associated with the structure as shown in the graph of FIG. 6, and according to a simulation process illustrated on FIG. 4. Input forces $F_i(\omega)$ with i=1, 2, . . . ,k, . . ., n are calculated at step 50 according to a point source radiation model as well known in the art, to provide the m complementary sets of correlated input acoustic pressure-related data in the frequency domain representing m complementary acoustic excitation signals. At step 52, The first natural frequencies $\omega_{n,m}$ and mode shapes $\phi$ are obtained with an analytical plate model defined as follows:

Frequency:

$$\omega_{r,p} = \left(\frac{D}{M}\right)^{1/2} \left[\left(\frac{p\pi}{a}\right)^2 + \left(\frac{r\pi}{b}\right)^2\right] \quad (9)$$

Mode shapes:

$$\phi = \sin\left(\frac{p\pi}{a}\right)x \ \sin\left(\frac{r\pi}{b}\right)y \quad r = 1, 2, 3 \quad p = 1, 2, 3 \quad (10)$$

With:

$$D = \frac{E^3}{12(1 - v^2)} \quad (11)$$

$$M = \rho h \quad (12)$$

wherein h is plate thickness, a is plate length, b is plate width, E is Young's modulus, p is material density of the plate and v is the Poisson's coefficient, D and M being parameters related to the material properties of the plate. The damping factor can be calculated as follows:

$$\xi = \frac{\Delta \omega}{2\omega} \quad (13)$$

wherein $\Delta \omega$ is the frequency bandwidth corresponding to half of natural frequency amplitude. Then, at following step 54, a usual modal superposition algorithm is applied to derive the theoretical structural transfer functions $H'_{iY}(\omega)$ as well as the vibration response $Y(\omega)$ of the structure, using the following relation:

$$Y(\omega) = \left( \sum_{i=1}^{n} \frac{\phi_i^T \phi_i}{\omega_i \left[ 1 - \left(\frac{\omega}{\omega_i}\right)^2 + 2j\xi \frac{\omega}{\omega_i} \right]} \right) F(\omega) \quad (14)$$

Figure 5:
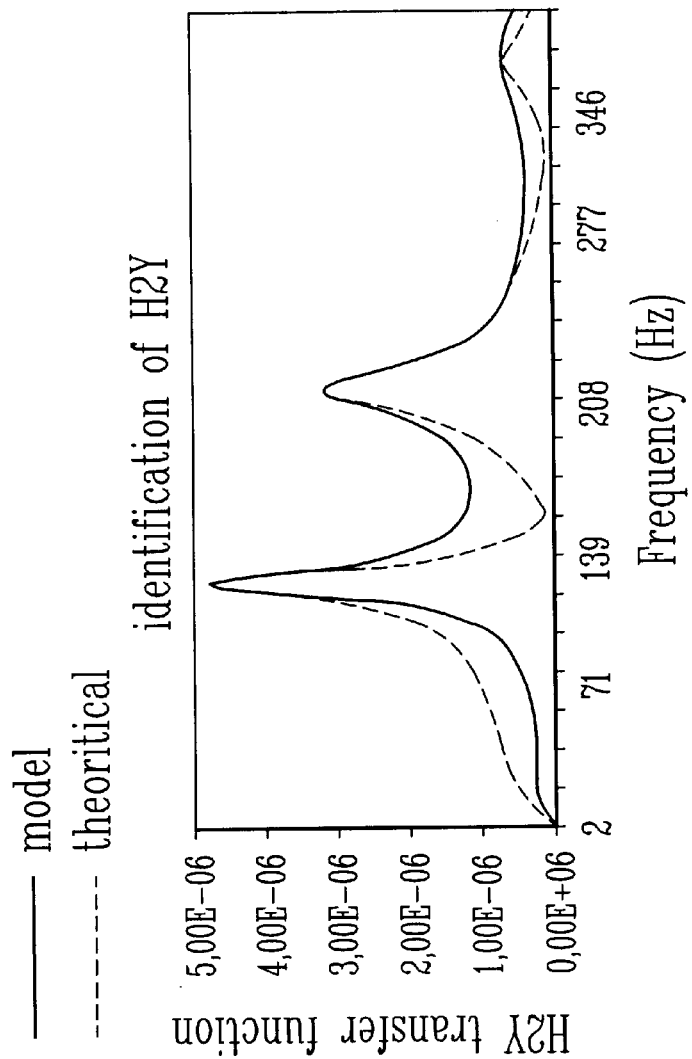
FIG. 5 is a graph showing an example of structural transfer function $H_{iY}$ for i=2 that has been identified by the method and apparatus of the present invention.

At following step 56, the MISO model with coherent excitations is used to determine the mode shapes and the structural transfer functions $H_{iY}(\omega)$ of the plate according to the model of the invention. As shown in FIG. 5 wherein both theoretical and modeled structural transfer functions $H'_{2Y}(\omega)$, $H_{2Y}(\omega)$ are plotted for the 0–400 Hz frequency range, it can be seen that both curves mutually correspond in amplitude and frequency in the area of the natural or resonance frequencies. FIG. 6 shows a mode shape comparison for the first resonance frequency of the plate, wherein amplitude values associated with the seven (7) excitation locations $P_1$ to $p_7$ were used along with boundary conditions to interpolate amplitude values associated with $P_8$ and $p_9$. Then, a validation of the MISO modeling is performed at step 58, wherein a Mode Assurance Criteria (MAC) analysis between the theoretical and modeled mode shapes, as described in D. J. Ewins, <<Modal Testing: Theory and practice>>Research Studies Press, 1984, yields to MAC=1 fo all seven (7) identified mode shapes, thus indicating a perfect mode shape identification using the model according to the invention.

What is claimed is:

1. A modal analysis method for determining dynamic vibration characteristics of a structure under acoustic excitation, said method comprising the steps of:
   providing m complementary sets of correlated input acoustic pressure-related data in the frequency domain representing m complementary acoustic excitation signals, all said sets of data being provided according to n spatially distributed locations associated with the structure with m≧n, each said set including reference input acoustic pressure-related data provided according to a reference one of said locations;
   providing m corresponding complementary sets of output vibration data in the frequency domain in response to said acoustic excitation at a reference point on the excited structure corresponding to the reference location;
   providing m corresponding complementary sets of n input transfer functions characterizing the correlation between each said set of input acoustic pressure-related data and the reference input acoustic pressure-related data;
   obtaining n structural transfer functions characterizing each said set of input acoustic pressure-related data from relations between said m sets of n input transfer functions and said m sets of output vibration response data; and
   deriving from the structural transfer functions the dynamic vibratory characteristics of the acoustically excited structure.

2. A modal analysis method for acoustically determining dynamic vibration characteristics of a structure, said method comprising the steps of:
   a) generating an acoustic excitation signal toward n spatially distributed locations associated with the structure while the latter is held to allow vibration thereof, one of said locations being a reference location;
   b) sensing the acoustic excitation signal at said locations to produce a corresponding set of n correlated input acoustic pressure-related electrical signals, one of said electrical signals being a reference signal associated with said reference location;
   c) converting said set of n correlated input acoustic pressure-related electrical signals into a set of correlated input acoustic pressure-related data in the frequency domain including reference data associated with said reference signal;
   d) sensing induced output vibration in response to said acoustic excitation at a reference point on the excited structure corresponding to the reference location to produce an output vibration response electrical signal;
   e) converting said output vibration response electrical signal into a set of output vibration response data in the frequency domain;
   f) providing n input transfer functions characterizing the correlation between said input acoustic pressure-related data and the reference data;
   g) performing said steps a) to f) for m−1 complementary acoustic excitation signals with m≧n, to produce m−1 complementary sets of input acoustic pressure-related data and to produce m−1 complementary sets of output response vibration data;
   h) obtaining n structural transfer functions characterizing each said set of input acoustic pressure-related data from relations between said m sets of n input transfer functions and said m sets of output vibration response data; and
   j) deriving from the structural transfer functions the dynamic vibratory characteristics of the structure.

3. A modal analysis apparatus for determining dynamic vibration characteristics of a structure, comprising:
   acoustical source means capable of generating m complementary sets of correlated acoustic excitation signals toward n spatially distributed locations associated with the structure, one of said locations being a reference location;
   a structure holder provided with attachment means for holding the structure while allowing thereof to vibrate under said acoustic excitation signals;
   acoustic sensor means responsive to the acoustic excitation signal at said locations to produce m complementary sets of n correlated input acoustic pressure-related electrical signals, one of said electrical signals being a reference signal associated with said reference location;
   Fourier transform means for converting said sets of correlated input acoustic pressure-related electrical signals into sets of correlated input acoustic pressure-related data in the frequency domain including reference data associated with said reference signal;
   vibration sensing means responsive to induced output vibration in response to said acoustic excitation at a reference point on the excited structure corresponding to the reference location to produce m complementary output vibration electrical signals;
   Fourier transform means for converting said output vibration electrical signals into m sets of output vibration data in the frequency domain; and
   data processor means responsive to said sets of correlated input acoustic pressure-related data and to said sets of output vibration data for providing n input transfer functions characterizing the correlation between each said set of acoustic pressure-related data and the reference data, for obtaining n structural transfer functions characterizing each said set of input acoustic pressure-related electrical data from relations between said m sets of n input transfer functions and said m sets of output vibration response data, and for deriving from the structural transfer functions the dynamic vibratory characteristics of the structure.

* * * * *

UNITED STATES PATENT AND TRADEMARK OFFICE
CERTIFICATE OF CORRECTION

PATENT NO. : 6,763,310 B2
DATED : July 13, 2004
INVENTOR(S) : François Lafleur et al.

It is certified that error appears in the above-identified patent and that said Letters Patent is hereby corrected as shown below:

Column 8,
Line 5, the letters "hd" should be deleted from the formulae;

Column 9,
Line 18, the term "$P_1$" should read -- $p_1$ --;
Line 20, the term "$P_8$" should read -- $p_8$ --.

Column 10,
Line 30, thereof, the term "j)" should read -- i) --.

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO.     : 6,763,310 B2
DATED          : July 13, 2004
INVENTOR(S)    : François Lafleur et al.

It is certified that error appears in the above-identified patent and that said Letters Patent is hereby corrected as shown below:

Column 2,
Lines 18-51, replace with the following paragraph:

--According to the above object, from a broad aspect of the present invention, there is provided a modal analysis method for determining dynamic vibration characteristics of a structure under acoustic excitation. The method comprises a first step of providing complementary sets of correlated input acoustic pressure-related data in the frequency domain representing complementary acoustic excitation signals, all sets of data being provided according to spatially distributed locations associated with the structure with, each set including reference input acoustic pressure-related data provided according to a reference one of the locations. The method further comprises steps of providing corresponding complementary sets of output vibration data in the frequency domain in response to the acoustic excitation at a reference point on the excited structure corresponding to the reference location and providing m corresponding complementary sets of input transfer functions characterizing the correlation between each set of input acoustic pressure-related data and the reference input acoustic pressure-related data. The method further comprises steps of obtaining structural transfer functions characterizing each set of input acoustic pressure-related data from relations between the sets of put transfer functions and the sets of output vibration response data and deriving from the structural transfer functions the dynamic vibratory characteristics of the acoustically excited structure.--

Signed and Sealed this

Twenty-seventh Day of September, 2005

JON W. DUDAS
*Director of the United States Patent and Trademark Office*